Patented Jan. 14, 1947

2,414,415

UNITED STATES PATENT OFFICE 2,414,415

PRODUCTION AND UTILIZATION OF COLD SETTING POLYHYDRIC PHENOLIC ALDEHYDE RESIN ADHESIVES

Philip H. Rhodes, Butler, Pa., assignor to Pennsylvania Coal Products Company, Petrolia, Pa., a corporation of Pennsylvania No Drawing. Application July 15, 1943, Serial No. 494,850

32 Claims. (Cl. 154—140)

This invention relates to the production and utilization of polyhydric phenolic aldehyde resin adhesives, said resin adhesives also being known as polyhydroxy benzene aldehyde resin adhesives.

The invention is primarily directed to the production of a polyhydric phenolic aldehyde resin adhesive which, when used as a bonding agent, will set to a neutral state, and, in the more specific form of the invention, will set to such neutral state at a relatively low temperature varying between 40° and 120° F., and more particularly within a temperature range varying between 60° and 100° F.

The present invention in its more specific form is directed to a so-called "cold-setting" resin adhesive, and the utilization of said adhesive as a bonding medium. While the novel resin adhesive herein set forth may be used as a bonding agent to unite various materials, it is particularly useful as a bonding agent for bonding wooden members, including plywood, one of its primary applications being in the production of airplane bodies, plywood parts, and other cellulosic airplane parts. Therefore, the utilization of the bonding medium primarily will be set forth in connection with the production of plywood and assembly gluing of wooden articles.

It is known to produce and utilize as a bonding agent cold setting resin adhesives of the urea formaldehyde type, said adhesives setting within a temperature range as low as 70° to 75° F. However, in order to set the urea formaldehyde glues, it is necessary to use an acidic hardening agent, or, as it is sometimes termed, an acidic hardening catalyst, the usual hardening agents being hydrochloric acid, aluminum chloride, aluminum sulphate, and the like, the latter typifying acids per se and acid hydrolyzing salts.

One field wherein these resins are used is in the production of articles in which a plurality of members is bonded one to the other. It has been well known in the art that the use of an acidic hardening agent has a number of disadvantages, but prior to the present invention it has not been possible to bond with a resin adhesive at a relatively low temperature, that is, between 40° and 100° F., or 110° F. without the use of an acidic hardening agent or catalyst. When such a hardening agent is employed, the acid component is partially absorbed by the wood, causing deterioration of the wood from the standpoint of tensile and shear strength, said deterioration appearing particularly upon aging of the bonded article at elevated temperatures above 100° F. such as are common in hot climates, the reduction in tensile and shear strength in some cases being as much as 50%. While the urea formaldehyde resin adhesives have a number of defects which are not present in the adhesive of the present invention, the most outstanding defect is the deterioration by the acidic hardening agent of the structure of the cellulosic medium which is bonded.

It is well known that the urea formaldehyde resin adhesives have exceedingly poor water resistance, and in order to fortify the water resistance of the urea formaldehyde bond, it has been proposed to add a fortifying agent, as, for example, resorcin, but in order to set the so-fortified urea resin it is necessary to use an acid hardener, and therefore all the disadvantages inherent in the ordinary urea formaldehyde resin adhesives are also present in the fortified urea aldehyde adhesives, except that the water resistance is slightly improved. However, while there is some improvement, the fortified urea aldehyde resin adhesive bonds are not boilproof. Articles bonded with the fortified urea resin adhesives, upon insertion in boiling water, fall apart upon continued boiling. Articles bonded with the set resin adhesives of the present invention when boiled in water for a period of 5 to 6 hours often show tensile shear values between about 5% to 15% higher than the original dry samples. This increase is primarily due to the softening of the wooden members bonded, making them more elastic or flexible.

It has also been proposed to use monohydric phenol aldehyde adhesives, as, for example, those produced by reacting phenol per se, cresol, and cresylic acid with formaldehyde to form potentially reactive "cold setting glues," but, here again, it is necessary in using these adhesives for cold bonding purposes, to set them in the presence of an acid hardening agent or catalyst.

More recently, it has been proposed to use melamine formaldehyde condensation products as cold setting glues, but glues of this character also require an acidic hardening agent to set them at temperatures of 40° to 100° F.

In accordance with the present invention, a permanently fusible polyhydric phenolic aldehyde resin, which may be acid in itself, or neutral, or alkaline, is dissolved in a solvent to thereby provide a water containing resin solution which is capable, in the presence of a setting agent, of setting to a neutral state, said solvent medium being characterized by the property of effecting little deterioration of the wood when in contact therewith, although said solvent solution of the resin may exhibit a pH varying over a wide acid range. Therefore, while the solution may give some indication of acidity, the latter is due principally to the presence of the hydroxyl groups in the polyhydric phenolic resin. In general, the solvent may be water, which is neutral, or any substantially neutral organic solvent, as, for example, alcohol, acetone, methyl ethyl ketone, or any of the solvents hereinafter set forth, or their equivalents. Of course, the solvent may be slightly acid or slightly alkaline due to impurities in the product. The solvent is not the type of compound which has previously been used as a hardening agent in the setting of resin adhesives, as, for example, an inorganic acid or an acid salt, organic acid, or an organic compound generating in the bonding solution a substantial acid component.

It has been further discovered that in order to set the resin adhesive of the present invention within a limited time, that is, broadly, within 24 to 48 hours, or in a more limited time, as within 12 to 24 hours, or even within a time range varying between a few minutes to 10 hours, at a temperature below 100° F. to 120° F., and desirably varying from 40° to 120° F., the resin adhesive must have a pH of below 2.5 or above 6, said resin adhesive having present a permanently fusible polyhydric phenolic aldehyde resin, as, for example, a resorcin formaldehyde resin; and be set with a setting agent providing free formaldehyde, as, for example, formaldehyde itself, or material from which formaldehyde is readily liberated, as, for example, paraform, and alkaline earth methylol sulfamates; or a phenolic casting syrup well known in the art as a hydrophilic liquid phenol resin, said casting syrup or hydrophilic phenol resin having a high ratio of formaldehyde to phenol, of the order of 2:1 or 3:1.

In one form of the invention, the pH of the resin adhesive may be maintained below 2.5 or above 6 by incorporating in the resin adhesive a permanently fusible polyhydric phenolic aldehyde resin which in itself has a pH of below 2.5 or above 6, it being understood that the liquid non-resin component of the resin adhesive is of such a character that it will not materially alter the pH of the adhesive.

The pH of the resin adhesive may also be maintained within the limits set forth so that it will cold set at the temperatures and within the time limits referred to herein by incorporating in the resin adhesive a permanently fusible polyhydric phenolic aldehyde resin which has a pH between 2.5 and 6, and adding an agent which will bring the pH of the resin adhesive up to above 6 or down to below 2.5. In the former case, the pH will be brought up to above 6 by adding a suitable alkaline compound which will function to increase the pH to the desired extent. When it is desired to bring the pH to below 2.5, a suitable acid agent is added. It is desired to point out that when the resin adhesive is used for the bonding of cellulosic members it is desired to bring the pH above about 6 rather than below 2.5 to avoid acid deterioration of the cellulosic members, which occurs when the resin adhesive contains an added acid component. Desirably, the pH of the resin adhesive may be brought up from 2.5 to 6 or higher by adding a small quantity of caustic soda or by dispersing a small quantity of caustic soda solution through the resin adhesive. Instead of using inorganic compounds to increase the pH of the resin adhesive, organic compounds may be used, such as ethanolamine and triethanolamine.

When it is desired to bring the acidity of the resin adhesive below 2.5, acids or acid salts of the strong mineral acids or the weak organic acids may be used. Examples of the strong mineral acids are sulphuric acid, hydrochloric acid, phosphoric acid, and nitric acid. Examples of the weak organic acids are oxalic acid, citric acid, tartaric acid, maleic acid, and the like. Salts of these acids and equivalents thereof may be used.

In the above variations of the invention, the resin adhesive contains a setting agent of the character referred to which liberates free formaldehyde, sufficient to the formaldehyde being present to set up the two-stage resin which forms the resin base of the resin adhesive.

It is desired to point out that the resin adhesive is compounded just before use by mixing what is herein termed the "resin adhesive base" with the formaldehyde setting agent. The resin adhesive is then ready to be applied to the members which it is desired to unite.

In another variation of the invention, the pH of the resin adhesive is not adjusted to below 2.5 or above 6 until just prior to the application of the adhesive to the members which it is desired to bond. Illustratively, such a resin adhesive may be made by mixing a permanently fusible polyhydric phenolic aldehyde resin, as, for example, a resorcin formaldehyde resin having a pH between 2.5 and 6 with suitable solvents, fillers, and a suitable setting agent of the character herein set forth, said setting agent liberating free formaldehyde. The setting agent will not set the permanently fusible dihydric phenolic resin because the pH of the resin is between 2.5 and 6. Therefore, such a resin adhesive can be sold in bulk and transported without the resin component being set up, or at least the resin component will not be set up within a period of sixty days. In order to convert such a resin adhesive from an inactive adhesive to an active adhesive, suitable for use in cold gluing within the temperature range and within the time periods herein set forth, there is added, when the adhesive is to be used, a small amount of an agent which will effect a change of the pH of the resin adhesive to below 2.5 or above 6. These pH modifying agents may be of the character hereinbefore set forth.

Again, it is desired to point out that alkaline pH adjusting agents are preferably used in order to avoid the presence of any free acid in the resin adhesive, and in this manner prevent deterioration of cellulosic fibers which are bonded by the resin adhesive.

In describing the present invention, certain terms will be used which may be defined as follows: The term "resin adhesive" includes an adhesive base which has been mixed with a setting agent. The adhesive base includes a two-stage polyhydric phenolic aldehyde resin, as, for example, a resorcin formaldehyde resin, and such fillers and solvents as are necessary or desirable to impart desirable properties to the final resin adhesive. In carrying out the present invention, a two-stage polyhydric phenolic aldehyde resin is preferably used, said resin being defined as one prepared from less than one mol of aldehyde for each mol of the polyhydric phenolic compound used. In the preferred form the resin is one made by employing not over 0.85 mol of aldehyde for each mol of polyhydric phenolic compound used, and the softening point of the resulting condensation product or resin as determined on the usual copper bar should be under 135° C. When a bond is formed from the two-stage polyhydric phenolic aldehyde resin adhesive above set forth at a temperature below 95° or 100° F. or 120° F., and preferably between 40° and 120° F., the solution of the resin adhesive should have a pH of less than 2.5 or greater than 6.

The "adhesive base," which includes the condensation product or resin above set forth, preferably together with solvents and/or fillers, is mixed with the "setting agent," and the resulting mixture is defined herein as the "resin glue" or adhesive.

The term "usefulness" or "working life" as herein used defines the period throughout which the resulting resin adhesive or glue can be brushed or sprayed and during which the glue has not hardened or started to gel to any appreciable extent. In this connection, it may be pointed out that the "useful period," "working life," or "pot-life" of the resin adhesive is, to a major extent, determined by the range of curing temperature employed.

After the resin glue has been prepared and while it is still in a useful state, it may be applied to the surfaces to be joined and the latter may be brought together and immediately placed in contact, or said surfaces may be air-dried, as is the customary practice, for a period of time which may vary in accordance with standard practice, but which usually does not exceed 1 to 1½ hours. Thereafter, the so-prepared work pieces may be joined, and, if necessary or desirable, pressure may be applied.

In general, it may be stated that the amount of pressure applied and the time during which the pressure is applied must be sufficient to insure intimate contact between component parts during the time the resin adhesive or glue sets and hardens to a bond of adequate strength. However, it is a distinctive characteristic of the resin adhesive of the present invention that at a temperature below 120° F., and preferably between 40° and 120° F., only a small pressure need be used to develop a bond having a shear strength meeting the shear strength specifications set forth by the Army and Navy for cold bonded wood joints, the minimum permissible shear strength developed by the bond being 2,800 pounds per square inch for bonded parallel maple joints. Using the resin adhesive of the present invention, Vermont Rock maple has been bonded at 75° F. employing pressures of the order of 50 pounds per square inch over a period of 12 hours, followed by a rest or final set period of 12 hours, the bond developed in the standard shear test being of the order of 6,000 pounds per square inch and with 80% to 100% wood failure. By "wood failure" is meant that the bonded pieces did not fail along the glue line but the bulk of the failure occurred in the wood itself. This is in contrast to the pressures which must be employed using either straight urea formaldehyde cold setting glues or the fortified resin urea aldehyde glues hereinbefore referred to.

It is sometimes necessary to age the work piece after the bond has been set for a period of time to obtain a maximum bond shear strength, and this period of aging is referred to herein as the "rest period." For example, after 4 to 10 hours under pressure a wood piece may be bonded sufficiently so that pressure may be removed and the piece may be handled for mechanical working and yet not be sufficiently aged to achieve maximum bond strength.

The term "polyhydric phenolic compound" is used herein in accordance with its previous usage in the art. It is a generic term to cover polyhydric phenols per se, as, for example, resorcin, catechol, and hydroquinone, and their substitution products and derivatives having three unsubstituted benzene ring positions and which will react with the aldehydes to produce permanently fusible resins which will become low temperature reactive with the setting agents herein set forth, and at the temperatures herein set forth. Examples of other dihydric phenolic compounds are cresorcin $(1)CH_3C_6H_3(2,4)(OH)_2$ and orcin $(1)CH_3C_6H_3(3,5)(OH)_2$. The phenolic compounds are divided into the monohydric compounds, the dihydric compounds, and the trihydric compounds. While the permanently fusible resins herein set forth are primarily derived from the dihydric phenolic compounds, the permanently fusible resins herein set forth may be derived from the trihydric phenolic compounds, or by copolymerization of mono-, di- and trihydric phenols with an aldehyde, as, for example, formaldehyde or its equivalent. While the polyhydric phenolic compounds are the preferred compounds which, in conjunction with aldehydes, form resins, the polyhydric phenolic derivatives which are substituted in one or both OH groups may be used in conjunction with the aldehydes to form resinous bodies in accordance with the present invention. However, usually there is a substantial reduction in the reactivity and the water solubility of the resinous bodies formed by reacting a substituted polyhydric phenolic compound with an aldehyde. Such derivatives include the lower alkyl ethers of resorcin, as, for example, the monomethyl ether of resorcin or the resorcin dimethyl ether.

A single aldehyde may be reacted with any of the phenolic compounds above set forth, or the aldehyde reacting medium may be a mixture of aldehydes, as, for example, formaldehyde and acetaldehyde. Dialdehydes, such as glyoxal, may also be employed as the aldehyde body.

Although the present invention may be carried out using any of the polyhydric phenolic aldehyde condensation products known in the prior art which have the properties hereinbefore pointed out, including the property of producing permanently fusible resins which will form a resin adhesive or glue on addition to the permanently fusible resin of a setting agent, it is preferred to use a resin produced in accordance with the disclosure of copending application Serial No. 426,629, now Patent No. 2,385,372 wherein there is disclosed the production of resins or resinous condensation products by initiating reaction in the absence of a catalyst between a dihydroxy benzene, as, for example, resorcin, and an aldehyde, as, for example, formaldehyde, continuing said reaction until a predominating proportion of the aldehyde is reacted with the dihydroxy benzene, and then adding a catalyst, which may be an acid, neutral or alkaline catalyst, to the reaction mass towards the end of the reaction, before any substantial gelation occurs and all of the aldehyde is reacted. The remainder of the aldehyde is then reacted in the presence of the catalyst, sufficient aldehyde being used to produce a thermoplastic, two-stage, permanently fusible resin. Thereafter, the resulting mass is dehydrated to form a resin having uniform physical and chemical properties.

The present invention will be illustrated by several examples in which the permanently fusible resin is that disclosed in said Patent No. 2,385,372.

EXAMPLE I

The adhesive base is formed from the following mixture:

| | Parts |
|---|---|
| Resorcin-formaldehyde two-stage resin | 2500 |
| Water | 1250 |
| Walnut shell flour | 500 |

In order to facilitate the solution of the resin and to avoid caking of the resin in the resin solvent, the resin is ground to between 20 and 40 mesh. Thereafter, it is poured into the aqueous solvent with stirring until the resin is dissolved. Hot water is desirably and normally used to hasten the solution of the resin. As soon as the solution is complete, the filler is added and carefully worked in to form a smooth, lump-free, sticky, heavy liquid. This adhesive base may be introduced into shipping containers and stored indefinitely without any harmful effects.

In the above example, the amount of water present is 50% of the weight of the resin. This amount of water is used in order to impart to the resulting adhesive base a suitable viscosity so that upon addition of the setting agent thereto the viscosity of the resin adhesive is such as to adapt it to be easily and uniformly applied to the work piece. The amount of water may vary greatly in accordance with the viscosity desired. The use of a filler, such as walnut shell flour, is optional, but usually it is a desirably used material, as it improves both the tensile and shear strengths of the resulting adhesive bond. The amount used is not critical and may vary considerably.

In the above example, if the resin adhesive formed therefrom is to be set at a temperature of less than 100° F., it is necessary that the permanently fusible resin have a pH of below 2.5 or above 6 in a 50% water solution. On the contrary, if the resin adhesive is to be set at temperatures below 200° or 212° F. and above about 100° F., then a permanently fusible resin may have any desirable pH, the pH in the broad form of the invention not being critical, but the reverse, as pointed out, is true when work pieces are to be set by what is commonly understood in the art as "cold gluing." The formaldehyde-liberating agent of the present invention may be supplied by an unstable addition product such as trimethylol melamine. Alternatively, the methylals may be used, these compounds being derivatives of formaldehyde and alcohols. The two-stage polyhydric phenolic aldehyde resin or, as it may be alternatively designated, dihydroxy benzene aldehyde resin, may be set up with such methylol containing compounds, as, for example, a solution of polymethylolphenol and its alkali salts. Any of the known methylol setting agents may be used.

An active methylol containing compound which has been found particularly effective is a high formaldehyde ratio phenolic "casting syrup," said syrup being produced when more than one mol of formaldehyde, and usually 2 or 3 mols, is reacted with one mol of phenol, always at comparatively low temperatures of the order of 40° to 60° C., and usually under vacuum using a mild alkaline catalyst.

A specific example of a formaldehyde setting agent is a commercial 37% solution of formaldehyde used in the following examples. When setting agents other than formaldehyde are used, the amounts will vary accordingly.

100 parts of the specific adhesive base above set forth may have added thereto 25 parts by weight of a 37% solution of formaldehyde setting agent, and the resulting mass is thoroughly mixed to form a homogeneous liquid mixture capable of being brushed or spread in the usual manner.

The amount of formaldehyde added to the adhesive base, as above set forth, is by way of illustration and not by way of limitation. It is obvious that the amount of formaldehyde or other setting agent may greatly vary. In connection therewith, it is desired to point out that the resin adhesive of the present invention has incorporated therein a two-stage permanently fusible polyhydric aldehyde resin, that is, a resin made by adding less than one mol of formaldehyde for each mol of dihydric phenol as, for example, resorcin used in preparing the resin. The amount of setting agent liberating free formaldehyde must be sufficient to convert in the cold the permanently fusible polyhydric aldehyde resin into an infusible insoluble resin. Stated differently, the total amount of formaldehyde liberating agent used in producing the permanently fusible dihydric phenolic resin and in converting the latter into an infusible insoluble state must be greater than one mol of said formaldehyde liberating agent to one mol of the dihydric phenolic compound, and preferably the ratio should be 1.1 of the formaldehyde liberating agent to one mol of the dihydric phenolic compound.

As previously pointed out, it has been discovered how to bond two members, preferably cellulosic members, together, with a so-called resin adhesive to provide a bond which will not deleteriously affect the members joined, said bonding of the members being effected at cold gluing temperatures. In the specific form of the invention, applicant has discovered that the polyhydric phenolic aldehyde resin adhesives will set in the cold, and, as has been pointed out, the permanently fusible monohydric phenolic aldehyde resins will not set in the cold and cannot be used for "cold gluing." Moreover, the supplemental discovery has been made that two members, preferably cellulosic members, may be bonded with a polyhydric phenolic aldehyde resin adhesive by "cold gluing," and the resulting members are not deteriorated or weakened by such acid components as may be present in the permanently fusible resin used because, regardless of the pH, either acid or alkaline, of the permanently fusible resin utilized in carrying out the present invention, the resin adhesive of which it is a constituent sets to a neutral bond, and sets in one form of the invention to such a bond without the use of any added acid hardening agent, such as is customary in the so-called "cold gluing" prior art wherein urea formaldehyde resin adhesives, fortified urea formaldehyde resin adhesives, or acid hardened monohydric phenolic aldehyde resin adhesives have been used.

Moreover, it is desired to point out that all of the resin adhesives, and particularly the phenolic aldehyde resin adhesives previously used, have been one-step heat-reactive resin adhesives. In other words, the prior art cold setting adhesives have depended on the addition of an acid catalytic agent to speed the reaction towards its infusible form without the application of heat, all of the reactive ingredients being present.

However, in this invention the hardening agent is one of the reaction components, and without its addition the resin base would not become hardened or set up even under the application of high temperatures.

The following test indicates how the neutrality or acidity of the bonding agents of the present invention may be determined. The adhesive mixture, prepared as herein set forth and containing the setting agent, may be tested to ascertain its bond neutrality in the following manner: A thin layer of the adhesive is spread on a glass plate and cured for a suitable time at a suitable curing temperature. Thereafter the cured film is stripped from the glass plate base, ground finely, and intimately mixed with distilled water. During 24-hour intervals the pH is determined by suitable means until two 24-hour readings are substantially the same.

More specifically, an adhesive may be prepared by taking the adhesive base set forth in Example I and mixing with it a setting agent, said adhesive base having as a component thereof a permanently fusible resorcin formaldehyde resin prepared in accordance with the disclosure of copending application Serial No. 426,629, now Patent No. 2,385,372, said fusible resin having a pH of below 2.5.

The so-prepared adhesive is spread upon a glass plate and is thereafter placed in an oven and heated to about 200° F. for about 45 minutes to 1 hour, whereby the adhesive film is cured to an infusible state. The resulting film is then stripped from the glass plate and finely ground, and about 10 grams of the resulting powder mixed with 50 grams of distilled water. This set solidified film is the full equivalent of a bonding agent which has been interposed between two members to effect bonding thereof, and in one form of the invention, between two cellulosic members, such as wood plies. The water solution of the bonding adhesive which has been stripped off of the glass plate showed a pH of about 7, using a Beckman meter.

The following illustrates how the resin adhesive of the present invention sets to a neutral state when used as a cold gluing bonding medium. The resorcin formaldehyde resin may be prepared in accordance with the disclosure of copending application Serial No. 426,629, Now Patent No. 2,385,372 so that it has a pH varying between about 1.5 and 2, it being desirable in one form of the invention to control the pH of the permanently fusible resin when it is to be used as a component of the "cold gluing" resin adhesive, that is, when the resin adhesive is to be set at temperatures below 100° to about 120° F. and preferably between 40° and 120° F., said set occurring in a reasonable length of time, which is less than 24 to 48 hours, and desirably is much lower, it being understood that the setting time of the resin adhesive is less as the pH of the permanently fusible resin decreases below 2.5 or increases above 6. The resin adhesive prepared from a resin having a pH of the character above set forth is then applied to a glass plate and left overnight at a temperature as low as from 45° to 55° F. The solidified resin is removed from the glass plate and the cured film is finely ground and 10 grams thereof mixed with 50 grams of distilled water. The pH determination of the water indicates that no substantial changes have occurred due to the addition of the set-up film to the water, thus indicating the neutrality of the film.

While in Example I the resin adhesive base is prepared by dissolving the permanently fusible polyhydric phenolic aldehyde resin in water, it is within the province of the present invention to prepare the adhesive base by dissolving the permanently fusible resin in other solvents or mixtures of solvents. Various solvents may be used, subject to the limitation that these solvents shall not impart to the resin adhesive any acid character which will deleteriously affect the members being bonded, as, for example, cellulosic material. The following example employs the principles of the present invention, the solvent component of the adhesive base being a mixture of alcohol and water:

EXAMPLE II

*Adhesive base—parts by weight*

| | Parts |
|---|---|
| 20–40 mesh resorcin-formaldehyde two-stage resin | 2500 |
| Solox solvent alcohol | 834 |
| Water | 416 |
| Walnut shell flour | 500 |

Solox alcohol defines a proprietary product furnished by the U. S. Industrial Alcohol Co. and said to consist of 100 parts of denatured alcohol to which about 5 parts of ethyl acetate have been added.

In compounding the above resin adhesive base, the water and the alcohol are mixed and warmed to about 75° C. to speed the solution of the resin which is added, and stirred occasionally until it is completely dissolved. The filler, exemplified by walnut shell flour, is then thoroughly mixed in to form a lump-free, viscous liquid which also may be stored for an indefinite period without deterioration. The resin adhesive or glue may be prepared by the addition of 25 parts of 37% formaldehyde for each 100 parts of the adhesive base.

The resin adhesive prepared as above set forth, when used to bond two work pieces produces a neutral, hardened set-up bond.

It has been ascertained that the assembly time of the adhesives prepared in accordance with the present invention may be increased by using a particular solvent medium in which to dissolve the permanently fusible resin. The solvent medium in which the permanently fusible polyhydric phenolic aldehyde resin may be dissolved should be characterized by its ability to wet the members to which it is applied, sufficiently to achieve a good bond. The composite solvent medium should also have the property of holding the glue on the glue line and keeping it tacky during the assembly period. Further, during the extended assembly period the solvent should have the property of not evaporating too quickly, since, if it does, the resin adhesive begins to set up before the assembly step can be completed.

In Example II the solvent medium is a mixture of alcohol and water, the alcohol being typical of a solvent component which exerts a marked wetting effect on cellulosic fibers, including wood fibers, and insures a good penetration of the resin adhesive at the glue line. In Example II the alcohol is mixed with water. Not only does the alcohol function to properly wet the wood fibers so that the resin adhesive may penetrate the wood cells at and adjacent the glue line, but the alcohol is typical of an agent which slows down the reaction between the resin adhesive base and the setting agent. It is also volatile, and thus on assembly it dries out to some extent, allowing the setting reaction to progress more rapidly.

Where large surfaces are to be coated, and where it is a major requirement that the resin adhesive remain tacky over an extended period, as, for example, 2 to 3 hours and longer, the solvent medium of the resin should comprise a primary agent which has the properties above set forth, together with a secondary agent which will keep the glue on the glue line, said agent functioning to change the viscosity of the resin adhesive base, and in many cases a third agent should be present, so that the solvent medium will not evaporate too quickly. The following is an example of a resin adhesive prepared in accordance with the present invention which will remain tacky over a period of 2 to 3 hours:

EXAMPLE III

Resin adhesive base—parts by weight

| | Parts |
|---|---|
| 20-40 mesh resorcin-formaldehyde resin having pH 6.5 in 50% solution | 3000 |
| Water | 1000 |
| Solox alcohol | 400 |
| Methyl cellosolve | 500 |
| Dioxan | 200 |
| Walnut shell flour | 600 |

Methyl Cellosolve is defined by Carbide and Carbon Chemicals Corp., makers thereof, as being ethyl glycol monomethyl ether,

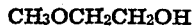

$$CH_3OCH_2CH_2OH$$

The above adhesive base may be compounded in a manner set forth in Examples I and II and can be packaged and stored as desired.

In order to prepare the resin adhesive, 120 parts of 37% formaldehyde are added to 570 parts of the homogeneous adhesive base above set forth. The resulting resin adhesive has a pot-life of about 4 to 5 hours at room temperature, and is particularly useful in the gluing of large assemblies.

In the above example, the alcohol is representative of an agent which wets and penetrates the members being glued at and adjacent the glue line. Instead of using Solox alcohol, other alcohols may be used, as, for example, methanol, ethanol, propanol, the butanols, the amyl alcohols, and in general the higher alcohols. Instead of using alcohols, any of the aliphatic or cyclic ketones may be used, as, for example, acetone, methyl ethyl ketone, cyclohexanone, and the like. The above are set forth as illustrative of a suitable primary component of the resin adhesive solvent medium which will adequately penetrate the wood or other cellulosic members at and adjacent the glue line. When the lower alcohols are used as a component of the solvent medium of the resin adhesive, the latter are characterized by low initial viscosity and a fairly high evaporation rate. When the higher alcohols are used, the intial viscosity is greater and the evaporation rate is slower.

Referring to the adhesive base set forth in Example III, the composite solvent medium is composed of Solox alcohol, which is fairly volatile, methyl Cellosolve, which is not quite so volatile, and dioxan, which is slightly more volatile than the alcohol, the alcohol having an evaporation number of about 200 and the Cellosolve having an evaporation number of about 50, both based on n-butyl acetate as 100 at room temperature. The methyl Cellosolve has such a low rate of evaporation that it keeps the work pieces at the glue line coated so that even after 1½ or 2 hours the resin adhesive retains its adhesive properties and the coated surfaces will properly adhere upon being assembled together, the resin adhesive curing to a uniform bond of high strength. For example, when the resin adhesive set forth in Example III is used to unite two pieces of Vermont Rock maple having dimensions of 2" x 2½" x ⅞" and the assembly cured in an atmosphere maintained at 150° F., there is developed in 2 hours a shear strength of 3700 pounds per square inch. Similar pieces were bonded with the resin adhesive of Example III for 7 hours at 70° F., whereupon there was developed a shear strength of 2100 pounds per square inch. Other pieces utilizing the adhesive set forth in Example III were cured at 70° F. for 24 to 48 hours and developed shear strengths of 4000 pounds per square inch and better, it not being uncommon, utilizing the adhesive of the present invention, for the shear strength of the bond of Vermont Rock maple to be as high as 6000 pounds per square inch. In general, it may be stated that, using the adhesive of the present invention, the bond strength equals or exceeds the strength of the wood being bonded. It is believed to be highly novel to provide a set polyhydric phenolic aldehyde bond which has a shear value equal to or greater than the shear value of the members which are being bonded, as, for example, cellulosic members or wood plies, said plies being bonded below 212° F., and desirably between 140 and 180° F. when some heat is used, or below 100° or 110° F. when the bond is effected by "cold curing," the latter, as stated, being a term well known in the art to denote the curing of assembly work pieces at temperatures below 120° F. and usually from about 40° to 95° F. It has been discovered that the glues of the present invention having, for example, a pot-life of about two hours at 80° F. will, when used as bonding agents for cellulosic materials as, for example, wood, give a bond strength equal to the strength of the wood in about 13 to 16 hours at 80° F., and the wood need only be under bonding pressure for 5 to 8 hours of this time period.

Experiments indicate that, utilizing the resin adhesives of the present invention, the shear and tensile bonding strength developed is from 10% to 40% higher than the shear and tensile bonding strength developed by urea formaldehyde bonds or fortified urea formaldehyde bonds, the latter including a resorcin component. This increase in tensile and shear bond strength is due, at least in part, to the lack of deterioration of the cellulosic fiber induced by an acid hardening agent, which must be utilized in cold setting urea aldehyde resins of the character above set forth. When "cold gluing" is used, the resin adhesive is compounded using a resin which will set within a reasonable time, as, for example, in less than 24 to 48 hours, said resin adhesive being produced by incorporating in a solvent medium a permanently fusible polyhydric phenolic aldehyde resin having a pH below 2.5 or above 6; or alternatively, a resin having a pH between 2.5 and 6 together with a pH modifying agent which will change the pH of the resin adhesive to below 2.5 or above 6. In connection with the above, it has been discovered that these pH limits are necessary in order to set the said resin adhesive within a period of less than 24 to 48 hours at a temperature below about 100° F. or below about 120° F., these temperatures all being the upper limits of room temperature as commonly known in the art.

Referring again to Example III, the composite solvent medium has present dioxan, which functions to increase the viscosity of the alcohol solution of the resorcin formaldehyde resin or the viscosity of the solution of the permanently fusible resorcin formaldehyde resin in a mixture of alcohol and methyl Cellosolve. Simultaneously, it has been discovered that when the resorcin formaldehyde resin is dissolved in an alcoholic solvent or an alcoholic solvent containing a glycol ether, not only the viscosity of the solvent medium may be increased by substituting, for part of said solvent medium, dioxan, but that the evaporation rate of the composite solvent may be altered, and this is highly advantageous when porous articles such as balsa wood and the like are to be bonded, the composite solvent medium functioning to keep the resin adhesive on the glue line for a period long enough to permit coating the surfaces to be bonded and laying them up in a period of time which may vary but can be extended so as to be as long as from one to three hours. Moreover, the dioxan assists in materially slowing down the reaction between the resin adhesive base and the subsequently added setting agent.

It has been stated that the permanently fusible polyhydric phenolic aldehyde resin may be dissolved in an organic solvent or in an aqueous solution of an organic solvent; said organic solvent may be any of the solvents set forth in Table I or mixtures thereof. In order that the resin adhesive may remain on the glue line for suitable time periods, the viscosity of the resin adhesive may be increased by using any agent which is compatible with the solution which will not interfere with the setting up of the adhesive and does not act as an acid catalyst; or, stated differently, does not act to deteriorate the cellulosic fibers. Methyl Cellosolve is merely an example of a suitable viscosity-increasing agent. For the dioxan there may be substituted any compound which will increase the viscosity of the adhesive base but which will not materially affect its evaporation rate. When it is desired to increase the viscosity of a solvent medium, as, for example, alcohol or Solox alcohol, or a mixture of the same with water, without materially affecting the evaporation rate or drying rate of the resin adhesive when it is applied to a surface to be glued, as, for example, wood, a proportionate amount of dioxan or its equivalent may be substituted directly in the solvent. The following Table I sets forth the evaporation rates of various agents which may be used in compounding the resin adhesive of the present invention, said evaporation rates or numbers being based on normal butyl acetate as 100 at room temperature, the evaporation being taken by weight:

TABLE I

| | |
|---|---|
| Acetone | 720 |
| Amyl alcohol | 30–40 |
| n-Butyl alcohol | 45 |
| Butyl carbitol | 2 |
| Butyl Cellosolve | 10 |
| Cellosolve | 40 |
| Cyclohexanol | 9 |
| Cyclohexanone | 25 |
| Dioxan | 215 |
| Alcohol, solvent | 203 |
| Ethyl lactate | 22 |
| Methanol | 370 |
| Methyl Cellosolve | 55 |
| Methyl ethyl ketone | 465 |
| Isopropyl alcohol | 205 |

The primary component of the solvent medium, or the entire solvent medium of the herein set forth resin adhesive may comprise any single solvent set forth in Table I or its equivalent from a functional standpoint, or a mixture of any of said solvents, or a mixture of their equivalents from a functional standpoint. The basic requisite of the primary component of the solvent medium is that it must wet the material being glued, and when used for the bonding of cellulosic material be substantially neutral in character, or at least have such properties which do not induce deterioration of the cellulosic fibers due to the acid components or acid generated components.

In general, the viscosity of the resin adhesive base may be maintained at any predetermined point by selecting a solvent medium which will assist in maintaining it at said predetermined point. In the following Table II there is set forth a number of solvent media which may be used as the entire or as the partial component of a composite solvent medium, said solvent medium in Table II being arranged in that order which will increase the viscosity of the resin when one of the given solvent agents is selected as a component of the solvent media. In other words, if methanol is used as a solvent medium and it is desired to increase the viscosity of the resin adhesive, there may be completely or partially substituted for the methanol, acetone.

TABLE II

*Solvent media for permanently fusible phenolic aldehyde resin in order to increase the viscosity characteristic of the solvent*

Methanol
Acetone
Solox alcohol
50% Solox alcohol–50% acetone
50% Solox alcohol–50% methyl ethyl ketone
Methyl ethyl ketone
50% Solox alcohol–50% methyl Cellosolve
50% Solox alcohol–50% dioxan
Methyl Cellosolve
Dioxan It is desired to point out that, prior to the present invention, it has been customary to cold glue thin sections of material, and preferably cellulosic material such as veneer sections, with urea formaldehyde resins or fortified urea formaldehyde resins by employing water solutions of the resins. When such water solutions have been employed as a resin adhesive for thin veneer sections, the thin veneers, upon the application of the resin adhesive, exhibit a decided tendency to curl and very often roll up, making them extremely difficult to assemble, one veneer on another, the term thin "veneer" as used in the present application being in its customary sense as used by those skilled in the art to denote any thin wood sections having a thinness well known in the art, but usually varying from about 1/100 of an inch to about 1/10 of an inch, or somewhat thicker. The curling of thin veneers is due primarily to expansion induced on one surface area of the veneer member due to the absorption of water by said surface area, the water inducing the expansion.

Cold setting glues of the urea formaldehyde type, because of their inherent characteristics, have always been used in water solutions. On the contrary, the glues of the present invention, when used for cold gluing, are preferably used in an organic solvent which may contain a small proportion of water, said resin adhesive, due to the presence of the organic solvent, preventing or entirely inhibiting the curling of the thin veneers. Although the organic treatment agents, which are constituents of the cold setting polyhydric phenolic aldehyde resin adhesives of the present invention, and more particularly the resorcin aldehyde resin adhesives of the present invention, wet cellulosic plies, as, for example, wood, and more particularly plywood, the resin adhesive does not wet the wooden plies in a manner similar to water, so as to cause expansion and curling, but, on the contrary, said expansion and curling are inhibited in accordance with the present invention.

In preparing the present resin adhesive the amount of the solvent component used will be determined primarily by the kind of material which it is intended to glue. For example, in assembly gluing of wooden pieces, such as the skins of aircraft to the ribs, scarf jointing, and lamination of wood as in the manufacture of plywood, the amount of solvent in the resin adhesive base may vary from as low as 10% to as high as 80%, but more commonly 20% to 35% or 40%. For particular applications, as in the impregnation of wood for fire-resistant or insect-resistant properties, or for the purpose of applying priming coats of adhesive, as is well known in the art, the solvent usually constitutes 75% to 90% or even 95% of the resin base. For the production of cold bonded laminated wood, paper, and cloth, as in the manufacture of tubing and hollow articles, where the resin adhesive is applied by impregnation, the solvent usually constitutes from 40% to 90% of the resin adhesive base. In the manufacture of cold bonded abrasive articles, the solvent concentration is relatively low, normally being from 5% to 25% of the adhesive base. For surface coating compositions to act as a sealer the resin base is usually composed of from 25% to 75%, or even higher, of solvent medium.

For special cold set work at temperatures ranging between 40° to 100° or 120° F., where 3 to 4 hours working life or "pot-life" is required, along with 2 to 3 hours open assembly, the less volatile solvents should be used to increase the working life of the resin adhesive, in order that the latter may have a long tacky period when applied to the work piece.

Summarizing, the solvent of the resin adhesive of the present invention has all or some of the following functions:

(1) To increase the "pot" or working life of the resin adhesive;
(2) To reduce or prevent the curling of thin veneers;
(3) To wet cellulosic material to produce the proper penetration for an exceedingly strong bond;
(4) To optionally increase the assembly time within a predetermined range, the solvent medium having a low evaporation rate to increase the assembly time, and a higher evaporation rate when the assembly time is relatively short; and
(5) To maintain the viscosity of the resin adhesive at a predetermined range, the solvent medium having a high viscosity for application to porous materials or a relatively low viscosity for the application to denser materials, so as to increase the penetrative properties of the resin adhesive.

It is desired to point out that when two members, such as plywood or a joint, are bonded by the resin adhesive of the present invention, at a temperature below 120° F., the amount of pressure used to assist in affecting the bonding is not critical. This is contrary to the present practice, wherein the acid setting resin adhesives are of the urea formaldehyde type or the fortified urea formaldehyde type. Said resins have required a pressure of about 125 to 250 pounds per square inch in order to develop an adequate tensile and shear strength after the resin adhesive and the work pieces have been assembled. On the contrary, when the resin adhesive of the present invention is used as a bonding medium for two members, as, for example, plywood members or other cellulosic wooden members, at temperatures below 120° F., no pressure is necessary to develop adequate tensile and shear bond strengths on the setting of the resin, provided the two surfaces which are assembled together are intimately in contact. Where the surfaces are not intimately in contact but are wavy in character, pressure may be used to cause the assembled surfaces to contact each other. The following example will illustrate how the resin adhesives of the present invention effect a bond strength equal to or greater than the wood itself without the use of any pressure.

Two 4" x 4" pieces of ⅛" mahogany poplar three-ply plywood were coated with the adhesive, superimposed one on the other, and cured for 4 hours at 90° F. At the end of this time, on knifing, the bond separation resulted in 100% wood failure, that is, the work piece failed not along the glue line but in the cellulosic member itself.

It may be pointed out that when urea formaldehyde resin adhesives are used as the bonding medium in uniting plywood and other members, usually the cure cannot be effected at temperatures below about 70° F. because the rate of setting of the urea formaldehyde resins is not sufficiently high at temperatures below 70° F. to provide an adequate bond in under 24 to 48 hours, and usually from 12 to 24 hours. On the contrary, the resin adhesives of the present invention, utilizing a polyhydric phenolic aldehyde resin adhesive, may be cured at temperatures much below 70° F., as, for example, 25° and 70° or even much lower, it being pointed out that the resin adhesives of the present invention still remain liquid at below zero, and some of them remaining liquid at temperatures of 70° below zero.

It may be stated that the low setting resin adhesives of the prior art, that is, those resins that set below 212° F., may heat set at temperatures above 212° F. without the addition of any acid setting agent, whereas the cold setting adhesives of the present invention will not heat set at any temperature unless the setting agent has been added.

While the polyhydric phenolic aldehyde resin adhesives, and particularly the resorcin aldehyde resin adhesives, as, for example. the resorcin formaldehyde adhesives, may be used at room temperatures, that is, at temperatures varying between 40° and 120° F., it is ordinarily preferred that the resin adhesives be cold set at a temperature varying from 70° to 90° F. Where desirable, the curing can be materially accelerated if the temperature of cure is increased, the temperature range for accelerated cure varying between 125° to below 212° F. In this connection, it is desired to point out that the resin adhesives which have hereinbefore been set forth by way of pH limitation as not being of the cold setting type may be satisfactorily employed as bonding agents at temperatures above 125° F. and below 212° F.; such low temperature heat reactive resins are characterized by an exceedingly long pot-life, such as several days to several weeks, the pot-life being taken at 80° F. The resin adhesives of the present invention, when used as bonding agents, are capable of hardening to an infusible, insoluble set-up form when cured at temperatures from 40° to 120° F. in about 24 to 48 hours, and usually are capable of setting to an infusible, insoluble set-up form having a shear strength equal to or better than the shear strength of the cellulosic members being united in about 1 to 8 hours when employing the resin adhesive of the present invention, which will set within said temperature range due to the pH of the resin adhesive being maintained within a range to confer cold setting properties upon the resin adhesive, and by "cold setting properties" is meant the ability to set at temperatures below about 120° F., although in the usual form of the invention the cold setting is usually carried out at temperatures below 95° or 100° F., and ranging from about 40° to 95° or 100° F., it being usually necessary to maintain the pH of the resin adhesive below 2.5 or above 6.

It is desired to point out that the time it takes for the resin adhesive of the present invention to set a bond approximating the tensile or shear strength of the wood or other cellulosic member which is being bonded, or to a tensile or shear strength greater than the cellulosic medium being bonded, will vary in accordance with the pH of the resin adhesive. In order for the resin adhesive to bond with the properties above set forth in 1 to 8 hours, it is usually necessary that the resin adhesive, and in one form of the invention the permanently fusible resin base have a pH lower than about 2.5 or above 6, and in order to have the resin adhesive of the present invention produce a bond having the properties above set forth in a substantially greater time, as, for example, 24 to 48 hours, the pH of the resin adhesive and in one form of the invention that of the permanently fusible resin base, as, for example, the permanently fusible resorcin formaldehyde resin, should be below 2.5 or above 6. Stated differently, it is novel with the applicant to control the time of setting of the resin adhesive to form a bond having the properties above set forth or approximating said properties by varying the pH range within the limits above set forth. When the resin adhesives of the present invention are set at temperatures from above 120° to 200° F., pH control is not necessary and the speed of setting or hardening the resin adhesive to an infusible, insoluble set-up state may range from 2 hours to 1 minute. While the pH control is not absolutely necessary when setting temperatures above 120° F. are used, it is desired to point out that it is within the province of the present invention to provide a resin adhesive containing a permanently fusible two-stage polyhydric phenolic aldehyde resin, as, for example, a resorcin formaldehyde resin having a pH between 2.5 and 6, there also being present in the resin adhesive a formaldehyde liberating setting agent, said resin adhesive being inactive until there is added to the adhesive composition a pH modifying agent which will change the pH of the resin adhesive to below 2.5 or above 6, and thereby convert the resin adhesive from the inactive to the active state. The amount of the pH modifying agent used influences the temperature of cure, the greater the amount of the modifying agent used, the lower the curing temperature below about 200 or 212° F.

Since the resin adhesive is inactive in the presence of the setting agent until the pH of the setting agent is modified in accordance with the above, the inactive resin adhesive may be packaged and transported in the inactive state. In other words, the inactive resin adhesive may be sold to the ultimate consumer and the latter may convert the inactive resin adhesive to an active state just before the resin adhesive is applied to a work piece or plurality of work pieces by dispersing through the inactive adhesive an acid pH modifier to bring the pH of the resin adhesive below 2.5, or an alkaline pH modifier to bring the pH of the resin above 6. A small amount of caustic soda or caustic potash is representative of the alkaline modifying agents, and the strong mineral acids such as hydrochloric acid, sulphuric acid, phosphoric acid, nitric acid, and the weak organic acids such as oxalic acid, tartaric acid, and maleic acid are representative of acid modifying agents. The basic modifying agents may also be the weak organic bases such as ethanol amine, triethanol amine, and the like.

It is desired to point out that the resin adhesive of the present invention may be used for patching purposes, as for patching any wooden airplane parts at outdoor temperatures, which may be as high as 110° or 120° F., or even higher as, for example, 150° F.

The resin adhesives of the present invention may be made without fillers or extenders. Where the contact surfaces are plane, said glues will be equally effective in gluing and developing the required predetermined optimum bonding strength. Although walnut shell flour has been set forth in the examples, other fillers or extenders which are the equivalent thereof may be used. Among these fillers or extenders are protein meals, starch compositions, cocoanut shell flour, powdered lignin, finely powdered metals, inorganic compounds, such as barium sulfate, ground slate, iron oxide such as Venetian red, and other organic and inorganic materials which exert no deleterious effect on the bond or the bonded material.

In accordance with the present invention, unfilled resin adhesives compounded as herein set forth are particularly useful in low temperature bonding, that is, at temperatures below 120° F., of strips or sheets of paper, cloth, wood, and the like, to form hollow articles such as tubes, tanks, ducts, and similar articles. The unfilled glue compositions herein set forth may be used in the production of molds for low pressure molding and for the casting of articles wherein are employed the methods usually used for the casting of sand, clay, plaster of Paris, papier-mâché, and the like. For example, macerated cloth or paper may be impregnated with the resin adhesives herein set forth and the impregnated materials shaped and formed, after which they may be cured at room temperature, that is, at temperatures varying from 40° to 90°–120° F., or at elevated temperatures as desired.

In the bonding of metal or other relatively nonporous materials, it has been found that excellent gluing may be obtained by applying a relatively thin coat of any of the resin adhesives herein set forth to the surfaces to be joined and allowing the resin adhesive to cure or partially cure prior to actually gluing the surfaces together in the customary manner. After the glue has been cured, or partially cured, by using a temperature varying from about 40° to about 100° or 120° F., which may be termed "cold gluing," the cured laminae may be given a second coat of glue and be bonded together under pressure, with further heating, if desired. The resin adhesives of the present invention may have a thermoplastic agent admixed therewith. This is highly desirable when the glue joint in use is subjected to flexural action, that is, where the joint is not rigidly fixed in one position. In such cases, elasticity is required. Although the resin adhesive film of the present invention is resilient and tough when cured, for such applications, it has been found that superior bonds may be obtained by blending a thermoplastic agent, or a plurality of thermoplastic agents, with the resin adhesive in any solvent medium, and then curing the dispersed glue in the presence of the thermoplastic agent while the joint is subjected to pressure and heat, if desired.

It is desired to point out that, for a portion of the dihydric phenol, such as resorcin, catechol, hydroquinone, and the like used in producing the two-stage polyhydric phenolic aldehyde resin herein set forth, there may be substituted an equivalent amount of a monohydric phenol typified by phenol per se $C_6H_5OH$, cresylic acid, or other monohydric phenols well known in the art, subject to the limitation that the resin adhesive prepared from the composite copolymerized dihydric and monohydric phenolic permanently fusible resins will function to bond a plurality of members, as, for example, cellulosic members, including plywood, at room temperatures, that is, temperatures below 100°, 110°, or 120° F., and usually above 25° F.

In the examples herein set forth, various amounts of setting agents, as, for example, formaldehyde, have been set forth. These amounts are by way of illustration and not by way of limitation. Functionally, all that is necessary is that sufficient setting agent be used to convert the adhesive base to its set-up form. Excess amounts are not known to be harmful. In the commercial application of the present invention, it is customary to set the adhesive resin base containing the permanently fusible resin with 10% to 50% of excess setting agent, including an excess of 37% formaldehyde solution.

It may be pointed out that it is well known that, in curing cellulosic members at temperatures in the vicinity of 240° to 350° F., the moisture loss in such hot pressing operations is of the order of 4% to 6%, resulting in it being necessary to rehumidify the pieces after completion of the curing or pressing operation. Also it is well known in the art that this alternate drying and wetting of the wood and the hot pressing at relatively high temperatures sets up stresses in the wood such that, on aging, warping frequently occurs. Many methods have been proposed for achieving curing temperatures below that of boiling water, wherein the moisture loss is usually less than 1%, and at such temperatures stress strains in the wood are greatly reduced and warping substantially prevented. As has been previously pointed out, prior art resin glues capable of being used as bonding media in this low temperature range have exerted harmful acid weakening effects on the wood. The adhesives of the present invention, however, not only provide a method of bonding at temperatures wherein no stresses are set up but also no deleterious effects because of acid hardening agents are produced in the wood. Thus, not only is warping prevented but higher strength values are present in the bonded assemblies because of the absence of moisture-heat-induced stress strains and because of the lack of wood-weakening acid compounds.

While Cellosolve has been set forth as a constituent of the resin solvent, not only may Cellosolve be used, the latter being an ether of ethylene glycol, but ethers of diethylene glycol, known as carbitol, may be used. Ethyl, diethyl, methyl and butyl Cellosolves are representative of glycol ethers containing an alkyl constituent, and phenyl Cellosolve and benzyl Cellosolves are representative of the aromatic containing Cellosolves. Methyl carbitol, butyl carbitol, and carbitol, the latter being diethylene glycol monomethyl ether, and diethyl carbitol are representatives of the carbitols which may be used in increasing the pot-life or working life of the resin adhesive herein set forth, and, what is of more importance, increasing the open assembly time. The glycol ethers all contain the radical $$-CH_2CH_2OH$$

The resin adhesives of the present invention are particularly useful in the bag molding art, where a rubber, Cellophane, paper, or other bag is employed as a surface for the transmission of air, steam, or fluid pressure in the production of molded articles. In the bag molding art, utilizing the resin adhesive of the present invention, the bag life is greatly increased, glue line failures due to insufficient pressure are eliminated, and lower operating temperatures result in mechanical economy and longer life of the molding apparatus.

The resin adhesives herein set forth, and particularly those set forth in Examples II and III, may be used in the manufacture of small wooden parts and their assembly to form furniture, airplanes, boats, houses, trusses, beams, skis, floats, and other articles of commerce. Referring to the production of airplanes, the present resin adhesive may be used in the production of airplane doors, aileron tabs, rudders, rudder tabs, struts or spar plates, inner sections and propeller blanks. For amphibian planes, the hulls thereof and pontoons may be made using the resin adhesive set forth. The resin adhesive of the present invention is also valuable in the bonding of laminae one to the other or to the bonding of a phenolic laminated part, such as an airplane tab or partition and the like to wood, rubber, leather, and other synthetic materials. By a "phenolic laminated part" is meant laminae such as cotton, paper, leather, wood, asbestos, or mixtures thereof, or, in general, mixtures of organic laminae with inorganic laminae, or mixtures of various types of organic laminae all assembled together under heat and pressure using a phenolic type of bonding agent, the so-produced laminated part usually carrying a phenolic coating. In general, any of the materials above set forth may be bonded to any of the other materials by utilizing any of the herein formulated resin adhesives. Such resins may be set and/or cured in the cold, that is, at temperatures ranging from 40° to 110°–120° F. but preferably at temperatures ranging from 60° to 90° F., and further the cure may be effected at a temperature below 212° F. in order to avoid dehydration of any of the members being glued which are subject to dehydration, as, for example, wood.

In preparing the permanently fusible polyhydric phenolic aldehyde resin, which is later dissolved in a solvent to form the resin adhesive base, any of the prior art aldehydes may be used, such as acetaldehyde, paraldehyde, propionaldehyde, the butyl aldehydes, the furfuraldehydes, and the like.

Where the pH of the permanently fusible resin has been referred to, it is to be understood that it is the pH of a solution formed by adding 50 parts of the permanently fusible resin to 50 parts of water.

The term "volatile liquid" or "volatile solvent" as used herein includes water or mixtures of water with organic solvents.

It is desired to point out that the resin glue or resin adhesive of the present invention first acquires a preliminary set. By "preliminary set" is meant that time during which it is necessary to keep the work pieces in close contact with each other by means of clamps or weights until the glue has set to such a state that artificial means for keeping the pieces in contact may be removed. This time of preliminary setting will vary as herein set forth with the character of the glue, but usually varies from 1 to 10 hours at room temperatures.

The maximum set or cure is defined as that point at which the glue line has reached its maximum strength. It is not necessary to retain the work members in close contact by artificial means after the preliminary set has occurred. The glue continues, after the preliminary setting, to cure, and the maximum strength will usually be developed during a period varying between 10 to 48 hours, depending on the temperature of cure. The higher the temperature of cure, under 212° F., the less time it takes for the maximum tensile and shear strengths, as herein set forth, to be developed.

The resin adhesives of the present invention may be used as a bonding medium at temperatures below 120° F. to bond metal to metal, including non-porous metal to non-porous metal, or porous metal to porous metal, or non-porous metal to porous metal. Metals which may be bonded are steel, iron, steel alloys, such as chromium steel alloys, molybdenum steel alloys, zirconium steel alloys, and magnesium aluminum alloys. An aluminum member may be bonded to an aluminum member, this including the bonding of thin laminae of aluminum.

The resin adhesive of the present invention may be used to bond together units of different material, as, for example, steel to asbestos, or other mineral material, including laminae of steel to laminae of asbestos; steel to rubber; steel to paper; steel to wood; steel to leather, paper, nylon, and phenolic members or laminae. Rubber may be bonded to a ceramic member and ceramic members may be bonded to ceramic members. The composite member which is bonded by the low temperature resin adhesives of the present invention may comprise a laminated structure made up, for example, of wood, steel, asbestos, rubber and leather.

In accordance with the present invention, there may be provided an article comprising a plurality of fibrous members selected from any of the materials herein set forth, said members being bonded with a set and hardened neutral polyhydric phenolic aldehyde resin bond, the fibrous members substantially retaining their original moisture content. In connection therewith, it is desired to point out that previously it has been necessary to control the moisture content of fibrous materials to be bonded within relatively narrow limits, and, more commonly, between 4% and 10%. Occasionally, fibrous materials have contained as high as 15% moisture and as low as 1% or 2% moisture, but in these cases the bond which was achieved usually weakened on aging because of the discrepancy in moisture content between the plies after heating, as has been pointed out in connection with warping. It is also well known that when members maintaining a high moisture content of the order of 10% to 15% or 20% are hot pressed, explosions frequently occur on relieving the pressure, because of the trapped moisture which has been heated sufficiently to form high pressure steam. On the contrary, the present invention requires no such moisture control, in that woods of a saturated moisture content may be glued successfully as no steam-forming heat is required. The hot pressing operation results in unequal moisture distribution. After the high temperature operation is completed, the unequal moisture distribution of the wood results in warping as the panel reaches equilibrium, that is, when the moisture content of all members of the panel become constant by virtue of the migration of the moisture from areas of high moisture content to areas of lower moisture content and to and from the areas, this being a gradual process whereby the various members of the composite unit are conditioned to a substantially even distribution of moisture. As stated, this produces warping. However, in accordance with the present invention, the bonding is effected at low temperatures without any substantial migration of the moisture content of the members being bonded, and therefore no warping results in the final cooled composite member.

The composite unit of fibrous members bonded with the set and hardened neutral polyhydric phenolic aldehyde resin of the present invention is characterized by the members retaining during the bonding step their normal water content of 2% to 12% and rehumidification is not necessary. In accordance with the present invention it is possible to bond a plurality of fibrous members having an initial water content varying from zero to 20% or even higher. The bonds have a shear strength in pounds per square inch approximating that of the fibrous members, the term "fibrous" including cellulosic materials, natural organic fibers, such as silk, wool, and leather, and synthetic organic fibers such as nylon; and mineral materials, such as asbestos, glass fibers, mineral wools, and the like.

The term "substantially neutral volatile liquid" as used herein includes the usual volatile liquids of the prior art, and water, or such volatile liquids diluted with water.

It is desired to point out that instead of preparing the glue base from the brittle resin as herein set forth, the resin may be partially or completely dehydrated in the resin kettle, and while still in the molten state may be diluted with the desired amount of solvents, followed by the addition of the filler, the entire operation taking place in the reaction kettle. Using this method, there is poured from the reaction kettle a finished adhesive base. Further, instead of adding the filler as a final operation, the filler may be mixed initially with the resorcin or other dihydric or trihydric phenolic compound prior to the resin forming reaction. When the aldehyde is added to the kettle contents, the resin is formed in the presence of the filler. Employing this method, the filler is thoroughly dispersed throughout the final adhesive base. This method is under some circumstances preferred, since it completely eliminates the presence of lumps or undispersed filler in the resin base. When the filler is added after the resin is removed from the kettle, the resulting adhesive base frequently has present lumps of undispersed filler, and it is necessary to remove the same by screening the adhesive base.

The following is an example illustrating the production of an active cold setting resorcin formaldehyde adhesive from an inactive resin adhesive:

Example IV

| | Grams |
|---|---|
| Resorcin formaldehyde permanently fusible resin (pH about 3 to about 5) | 1000 |
| Solvent alcohol | 500 |
| Water | 100 |
| Walnut shell flour | 300 |
| Paraformaldehyde | 90 |
| Cellosolve | 90 |

The above mixture may be made by dissolving 1000 grams of a brittle, permanently fusible resorcin formaldehyde resin having a pH varying from about 3 to 5 in a mixture of alcohol and water, in the proportions as set forth above. The filler is then blended in to form a uniform mixture which is desirably cooled to a temperature varying between 60° and 90° F. The mixture is cooled so that, on adding a formaldehyde liberating agent, there is no tendency for the latter to become heat activated and thereby function to initiate the setting of the resin adhesive. The paraformaldehyde is then mixed in with the Cellosolve to form a lump-free dispersion, and the resulting mixture is mixed with the cooled adhesive base. The so-prepared resin adhesive has a pH range varying from about 3 to about 5, and therefore remains in an inactive, stable state for periods as long as sixty days, during which time the so-prepared inactive adhesive base may be transported to the user or stored until needed. In employing the resin adhesive for the cold gluing of members, under the limitation of heat and temperatures previously set forth, it is necessary, just prior to the application of the resin adhesive to the members to be glued, to modify the pH of the resin adhesive to below about 2.5 or 3 or above about 5 or 6, said modification being accomplished by the addition to the resin adhesive of a pH modifying agent of the character previously described. When the members to be bonded are cellulosic members, it is desirable to modify the pH of the resin adhesive to above 5 to 6 with an alkaline agent, as, for example, a 20% solution of sodium hydroxide. Other equivalent alkaline pH modifying agents well known in the art may be used, said equivalents including the alkali metal compounds, such as potassium hydroxide, potassium carbonate, sodium carbonate, lithium hydroxide and lithium carbonate, these being representative of inorganic modifying agents, and organic modifying agents typified by ethanolamine and triethanolamine, the use of said alkaline pH modifying agents being subject to the limitation that the pH modifying agent only exert a pH modifying action in the resin adhesive and otherwise be inert—that is, it should not function as a reaction ingredient with the resin adhesive, substantially dilute the resin adhesive, and substantially modify the glue or bonding properties of the resin adhesive.

It is desired to point out that the pot life and curing time may be varied by the extent to which the pH of the resin adhesive is raised or lowered, it having been ascertained that the lower the pH below about 3, and the higher the pH above about 5 to 6, the shorter the pot life, and the curing time, at any predetermined temperature, as, for example, 80° F. Illustratively, where the pH is 5, the pot life at 80° F. is approximately 48 to 72 hours. As the pH is raised to about 6.6 the pot life is reduced to about 2 hours. If the pH is raised to about 7, the pot life is of the order of 30 minutes at 80° F. It is to be understood that the above pot life figures are for a temperature of 80° F. If the temperature at which the resin adhesive is maintained is raised to about 95° F., the pot life values at the pH figures above recited are approximately decreased 50%.

Similarly, if the temperature at which the resin adhesive is maintained is decreased, as, for example, 60° to 65° F., the pot life at the pH figures above set forth is approximately doubled. As the pH of the resin adhesive is reduced below about 3, the shorter the pot life, and the latter decreases as the pH is reduced from 2.5 to 2.3, and finally to 2, the temperature being maintained at 80° F. As the temperature is raised, the pot life is decreased, and as the temperature is decreased from about 80° F., as, for example, to 60° to 65° F., the pot life is increased, that is, approximately doubled.

The following is an example showing the preparation of a resin adhesive base which is converted just before use into a resin adhesive by the addition of a setting agent. The polyhydric phenolic aldehyde resin used in preparing the resin adhesive is one that has a pH varying from 3 to 5. As pointed out, resin adhesives containing resins having this pH do not cold set at temperatures varying between 25° and 120° F. Therefore, there is added to the resin adhesive a pH modifying agent. The initial mixture is made in the following proportions:

Example V

| | Grams |
|---|---|
| Permanently fusible resorcin formaldehyde resin (pH about 3–5) | 1000 |
| Alcohol | 500 |
| Water | 100 |
| Walnut shell flour | 300 |

The resin having a pH varying from 3 to 5 is dissolved in a mixture of alcohol and water, heating being employed to facilitate the dissolving of the resin. When the solution is complete, a suitable filler, as, for example, walnut shell flour, is blended in to form a smooth, viscous, liquid, sticky adhesive base. At the conclusion of the mixing operation, a pH modifying agent is added so that the pH of the resulting adhesive base is below 2.5 or above 6. The modified adhesive base may then be mixed with a suitable amount of formaldehyde liberating setting agent and employed as a cold setting adhesive at the temperatures and for the times hereinbefore set forth.

When cellulosic materials are to be bonded with the adhesive, it is preferable that the pH of the resin adhesive be adjusted to above 6, rather than below 2.5, as the acid adjusted resin adhesive has a rather strong deteriorating effect on the cellulosic members. The alkaline pH modifying agent may be a 20% to 50% solution of sodium hydroxide or equivalents, such as pointed out above. After the adhesive base has been converted to the desired pH range, that is, below 2.5 or above 6, the adhesive base may be then stored indefinitely, and just prior to use the setting agent is added, as hereinbefore set forth.

Any of the resin adhesives herein set forth may be used in the manner disclosed in applicant's copending application Serial No. 461,038, of which this is a continuation in part. The resin bases herein set forth, or the potential resin adhesives which do not contain a setting agent, may be applied to the surfaces of the articles to be united; then, preferably, although not necessarily, allowed to dry; and thereafter the coating may be treated with an active methylene-containing setting agent. Within a reasonable period thereafter and before the active methylene compound has initiated any substantial set in the so-applied resin adhesive base or resin compound brought into solution, the component parts of the article are placed together and sufficient pressure is preferably applied to hold said component parts together during the time the so-compounded adhesive sets and develops its bonding strength.

The resin adhesives herein disclosed and those set forth in said earlier application Serial No. 461,038 may be applied to the surface to be bonded before the setting agent, as, for example, a methylene-containing compound, has an opportunity to react with the resin and initiate any substantial set thereof. After the application of the so-prepared adhesive, the methylene-containing compound begins to act on the resin and initiates the set-up thereof.

Any of the resin adhesives or resin adhesive bases set forth in said application Serial No. 461,038 may be used in accordance with the present invention.

This application is a continuation in part of application Serial No. 487,066, filed May 14, 1943, said latter application being a continuation in part of application Serial No. 461,038, filed October 6, 1942.

What is claimed is:

1. The method of bonding a plurality of cellulosic members one to the other comprising interposing between said cellulosic members a water-containing liquid resin adhesive and bonding medium containing a formaldehyde-liberating setting agent in an amount to set and harden the resin adhesive, together with a resin adhesive base formed by the admixture of a water-containing substantially neutral volatile liquid with the dihydroxy benzene-aldehyde resin condensation product of a dihydroxy benzene and a resin-forming aldehyde, said permanently fusible resin having a pH in 50% aqueous solution outside a pH range of 2.5 to 6 and setting and hardening the adhesive and bonding medium of the resulting assembly at a temperature varying between 40° and 120° F., and within a time period of less than about 48 hours.

2. The method of bonding a plurality of members one to the other comprising interposing between said members a water-containing liquid resin adhesive and bonding medium comprising the reaction mixture of a formaldehyde-liberating setting agent, a permanently fusible dihydroxy benzene-aldehyde resin condensation product of a dihydroxy benzene and a resin-forming aldehyde, said permanently fusible condensation product having a pH in 50% aqueous solution varying from 2.5 to 6, and a pH modifying agent which maintains the pH of the liquid resin adhesive outside a pH range varying from 2.5 to 6, and setting and hardening the adhesive and bonding medium of the resulting assembly at a temperature varying between 40° and 120° F. and within a time period of less than 48 hours.

3. The method of claim 2 wherein the permanently fusible dihydroxy benzene-aldehyde resin is a resorcin-aldehyde resin.

4. The method of bonding a plurality of members one to the other comprising interposing between said members a water-containing liquid resin adhesive and bonding medium comprising the reaction mixture of a formaldehyde-liberating setting agent, a permanently fusible resorcin-formaldehyde resin condensation product of resorcin and formaldehyde, said permanently fusible condensation product having a pH varying from 2.5 to 6, and a pH-modifying agent which maintains the pH of the liquid resin adhesive outside of a pH varying from 2.5 to 6, and setting and hardening the adhesive and bonding medium of the resulting assembly at a temperature varying between 40° and 120° F. and within a time period of less than 48 hours.

5. The method of bonding a plurality of members one to the other comprising interposing between said members a water-containing liquid resin adhesive having present a permanently fusible condensation product of a dihydroxy benzene and a resin-forming aldehyde; and a formaldehyde-liberating setting agent, said adhesive mixture having a pH outside of the range of 2.5 to 6, and setting and hardening the adhesive and bonding medium of the resulting assembly at a temperature varying from about 40° to about 120° F. and within a time period of less than 48 hours.

6. The method of claim 5 wherein the dihydroxy benzene-aldehyde resin adhesive is a resorcin-aldehyde resin adhesive.

7. The method of claim 5 wherein the permanently fusible dihydroxy benzene-aldehyde resin adhesive is a resorcin-aldehyde resin adhesive containing a formaldehyde-liberating setting agent.

8. A cold-setting resin adhesive comprising a water-containing liquid mixture of a permanently fusible dihydroxy benzene-aldehyde resin having in 50% aqueous solution a pH varying from 2.5 to 6, a formaldehyde-liberating setting agent in an amount sufficient to set said resin, and a pH-modifying agent which maintains the pH of the resin adhesive outside of the pH range of 2.5 to 6 and permits the resin adhesive to attain its maximum set at a temperature varying from about 40° F. to about 120° F. and within a period of less than 48 hours.

9. A cold-setting resin adhesive comprising a water-containing liquid mixture of a permanently fusible rescorcin-aldehyde resin having in 50% aqueous solution a pH varying from 2.5 to 6, a formaldehyde-liberating setting agent in an amount sufficient to set said resin, and a pH-modifying agent which maintains the pH of the resin adhesive outside of the pH range of 2.5 to 6 and permits the resin adhesive to attain its maximum set at a temperature varying from about 40° F. to about 120° F. and within a period of less than 48 hours.

10. A cold-setting resin adhesive comprising a water-containing liquid mixture of a permanently fusible resorcin-formaldehyde resin having in 50% aqueous solution a pH varying from 2.5 to 6, a formaldehyde-liberating setting agent in an amount sufficient to set said resin, and a pH-modifying agent which maintains the pH of the resin adhesive outside of the pH range of 2.5 to 6 and permits the resin adhesive to attain its maximum set at a temperature varying from about 40° F. to about 120° F. and within a period of less than 48 hours.

11. A liquid resin adhesive which cold-sets at a temperature varying between about 40° F. to about 120° F. comprising a water-containing liquid mixture of a permanently fusible dihydroxy benzene-aldehyde resin, and a formaldehyde-liberating agent present in an amount sufficient to set and harden the resin, the pH of the liquid resin adhesive being outside of a pH range of 2.5 to 6.

12. A liquid resin adhesive which cold-sets at a temperature varying between about 40° F. to about 120° F. comprising a water-containing liquid mixture of a permanently fusible resorcin-aldehyde resin, and a formaldehyde-liberating setting agent present in an amount sufficient to set and harden the resin, the pH of the liquid resin adhesive being outside of a pH range of 2.5 to 6.

13. A liquid resin adhesive cold-setting at a temperature varying between about 40° F. to about 120° F. comprising a water-containing liquid mixture of a permanently fusible resorcin-formaldehyde resin, and a formaldehyde-liberating setting agent present in an amount sufficient to set and harden the resin, the pH of the liquid resin adhesive being maintained outside of a pH range of 2.5 to 6.

14. The method comprising making a resin adhesive which cold-sets at a temperature varying between about 40° F. and 120° F. and attains its maximum set within a time period of 48 hours, by forming a water-containing liquid mixture of a permanently fusible dihydroxy-benzene-aldehyde resin, and a formaldehyde-liberating setting agent present in an amount sufficient to set and harden the resin, while maintaining the pH of the liquid resin adhesive outside of a pH range varying between 2.5 and 6.

15. The method comprising making a resin adhesive which cold-sets at a temperature varying between about 40° F. and about 120° F. and attains its maximum set within a time period of 48 hours, by forming a water-containing liquid mixture of a permanently fusible dihydroxy-benzene-aldehyde resin which has in 50% aqueous solution a pH varying from 2.5 to 6, a formaldehyde-liberating setting agent in an amount sufficient to set and harden the resin, and a pH-modifying agent which maintains the pH of the liquid resin adhesive outside of a pH range varying between 2.5 and 6.

16. The method comprising making a resin adhesive which cold-sets at a temperature varying between about 40° F. and 120° F. and attains its maximum set within a time period of 48 hours, by forming a water-containing liquid mixture of a permanently fusible resorcin-aldehyde resin, and a formaldehyde-liberating setting agent present in an amount sufficient to set and harden the resin, while maintaining the pH of the liquid resin adhesive outside of a pH range of 2.5 to 6.

17. The method comprising making a resin adhesive which cold-sets at a temperature varying between about 40° F. and 120° F. and attains its maximum set within a time period of 48 hours, by forming a water-containing liquid mixture of a permanently fusible resorcin-formaldehyde resin, and a formaldehyde-liberating setting agent present in an amount sufficient to set and harden the resin, while maintaining the pH of the liquid resin adhesive outside of a pH range of 2.5 to 6.

18. The method comprising making a resin adhesive which cold-sets at a temperature varying between about 40° F. and about 120° F. and attains its maximum set within a time period of 48 hours, by forming a water-containing liquid mixture of a permanently fusible resorcin-formaldehyde resin which has in 50% aqueous solution a pH varying from 2.5 to 6, a formaldehyde-liberating setting agent in an amount sufficient to set and harden the resin, and a pH-modifying agent which maintains the pH of the liquid resin adhesive outside of a pH range varying from 2.5 to 6.

19. The method comprising making a resin adhesive which cold-sets at a temperature varying from about 40° F. to about 120° F. and attains its maximum set within a time period of 48 hours, comprising forming a water-containing liquid resin adhesive base containing a permanently fusible dihydroxy benzene-aldehyde resin, said resin having in 50% aqueous solution a pH varying from 2.5 to 6, and a pH-modifying agent which maintains the pH of the liquid resin adhesive outside a pH range varying between 2.5 and 6, and prior to the use of said resin adhesive base adding thereto a formaldehyde-liberating setting agent in an amount sufficient to set and harden the resin.

20. The method comprising making a resin adhesive which cold-sets at a temperature varying from about 40° F. to about 120° F. and attains its maximum set within a time period of 48 hours, comprising forming a water-containing liquid resin adhesive base containing a permanently fusible resorcin-formaldehyde resin, said resin having in 50% aqueous solution a pH varying from 2.5 to 6, and a pH-modifying agent which maintains the pH of the liquid resin adhesive outside a pH range varying between 2.5 and 6, and prior to the use of said resin adhesive base adding thereto a formaldehyde liberating setting agent in an amount sufficient to set and harden the resin.

21. The method of bonding a plurality of members one to the other comprising interposing between said members a water-containing liquid resin adhesive containing a permanently fusible condensation product of a dihydroxy benzene and a resin-forming aldehyde; and a formaldehyde-liberating agent, said resin adhesive having a pH outside of the range of 2.5 to 6 and setting and hardening the adhesive and bonding medium of the resulting assembly at a temperature varying between 40° and 120° F.

22. The method of claim 21 wherein the adhesive resin component is a permanently fusible condensation product of resorcin and an aldehyde.

23. The method of claim 21 wherein the adhesive resin component is a permanently fusible condensation product of resorcin and formaldehyde.

24. The method of bonding a plurality of bondable members one to the other, comprising interposing between said members a liquid resin adhesive comprising the reaction mixture of an aqueous solution of a substantially neutral organic solvent, the latter having an evaporation number varying between 2 and 720 based on normal butyl acetate as 100 at room temperature, a resin reaction product of a dihydroxy benzene and an aldehyde, the molecular proportion of the latter to the former being less than 1:1, said resin reaction product constituting the essential resin component of the resin adhesive, said resin adhesive having a pH outside of the pH range of 2.5 to 6, and a formaldehyde-liberating setting agent in an amount to set and harden the resin adhesive; and setting and hardening the resin adhesive of the resulting assembly at a temperature varying between 40° F. and 120° F., and within a time period of less than 48 hours.

25. The method of claim 24 in which the dihydroxy benzene is resorcin.

26. The method of claim 24 in which the dihydroxy benzene is resorcin and the aldehyde is formaldehyde.

27. The method of claim 24 in which the aqueous solution is an aqueous solution of a lower aliphatic alcohol having the formula $C_nH_{2n+1}OH$, wherein $n$ varies from 1 to 5, inclusive.

28. The method of claim 24 wherein the aqueous solution of the substantially neutral organic solvent is an aqueous solution of a lower aliphatic ketone miscible with water.

29. The method of bonding a plurality of plywood members one to the other, comprising interposing between said plywood members a liquid resin adhesive comprising the reaction mixture of an aqueous solution of a substantially neutral organic solvent, the latter having an evaporation number varying between 2 and 720 based on normal butyl acetate as 100 at room temperature, a resin reaction product of a di-hydroxy benzene and an aldehyde, the molecular proportion of the latter to the former being less than 1:1, said resin reaction product constituting the essential resin component of the resin adhesive, said resin adhesive having a pH outside the pH range of 2.5 to 6, and a formaldehyde-liberating setting agent in an amount to set and harden the resin adhesive; and setting hardening the resin adhesive of the resulting assembly as a temperature varying between 40° F. and 120° F., and within a time period of less than 48 hours.

30. The method of bonding a plurality of plywood members one to the other, comprising interposing between said plywood members a liquid resin adhesive comprising the reaction mixture of an aqueous solution of a substantially neutral organic solvent, the latter having an evaporation number varying between 2 and 720 based on normal butyl acetate as 100 at room temperature, a resin reaction product of a dihydroxy benzene and an aldehyde, the molecular proportion of the latter to the former being less than 1:1, said resin reaction product constituting the essential resin component of the resin adhesive, said resin adhesive having a pH outside the pH range of 2.5 to 6, and a formaldehyde-liberating setting agent in an amount to set and harden the resin adhesive; and maintaining the plywood members with their original water-content varying between 2% and 12% by setting the bonding resin adhesive of the plywood assembly at a temperature between 40° and 120° F.

31. The method of claim 30 wherein the dihydroxy benzene is resorcin.

32. The method of claim 30 wherein the dihydroxy benzene is resorcin and the aldehyde condensed therewith is formaldehyde.

PHILIP H. RHODES.